Figure 1:
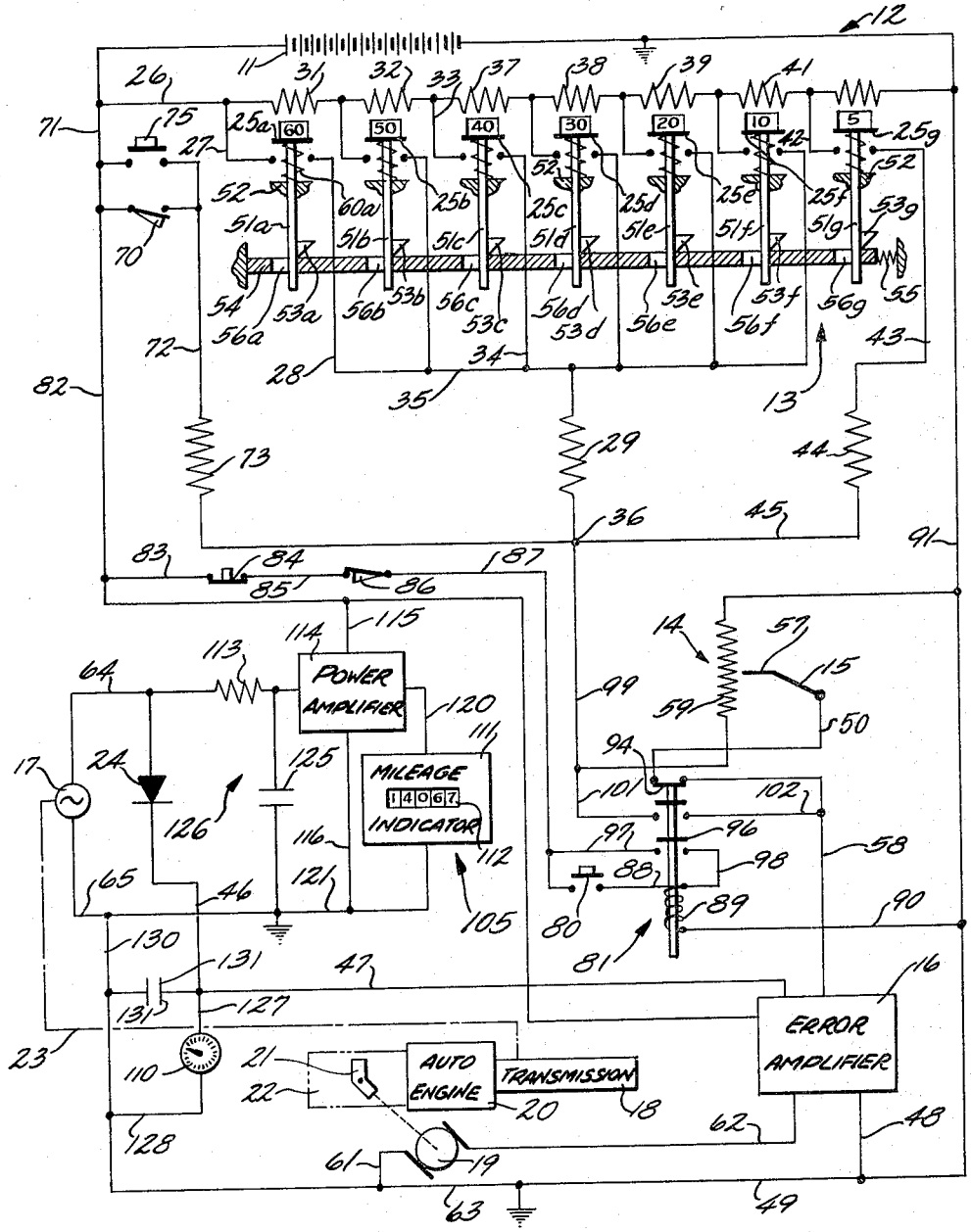

INVENTORS
Thomas A. Stoner
BY Thomas A. Stoner Jr.
Cyril M. Hajewski
Attorney

United States Patent Office 3,172,497
Patented Mar. 9, 1965

3,172,497
ELECTRICAL CONTROL AND INDICATING
SYSTEM FOR MOTOR VEHICLES
Thomas A. Stoner and Thomas A. Stoner, Jr., both of
1950 Eileen Court, Brookfield, Wis.
Filed Jan. 21, 1963, Ser. No. 252,650
10 Claims. (Cl. 180—82.1)

This invention relates generally to an electrical control and indicating system for motor vehicles and more particularly to an improved apparatus for electrically regulating the speed of a motor vehicle and for indicating its rate of travel and its distance of travel on electrical meters.

It is a general object of the present invention to provide an improved system for regulating the speed of an automobile and an improved indicator apparatus for indicating to the operator the rate of travel of the vehicle and the distance it has traveled.

Another object of the present invention is to provide an arrangement in which the throttle valve of the engine carburetor of a motor vehicle is adjusted by power under the control of an improved electrical speed control apparatus.

Another object of the present invention is to provide an improved speed control apparatus in which the accelerator pedal is connected to adjust an electrical circuit for regulating the speed of a motor vehicle to thereby eliminate the mechanical linkage between the accelerator pedal and throttle valve of the vehicle engine.

Another object of the present invention is to provide an electrical system for indicating the rate of travel and distance of travel of a motor vehicle to thereby eliminate the mechanical connections between the vehicle drive train and the speed and distance indicating meters.

A further object is to provide an improved vehicular speed control system in which the vehicle operator can set the maximum speed at which the vehicle is to operate and can then vary the speed of the vehicle from a zero rate of travel to the preestablished maximum rate of travel by manipulating the accelerator pedal.

A further object is to provide an improved vehicular speed control system in which the vehicle operator can set the desired speed of the vehicle on a control panel and such speed will be automatically maintained until the setting is changed or the brakes are applied.

A further object is to provide an improved speed control and indicating apparatus for motor vehicles which is inexpensive to manufacture but is extremely reliable and efficient in operation.

According to this invention the improved electrical control system comprises a resistor voltage divider provided with a plurality of push button switches for varying the voltage delivered to a potentiometer in accordance with the desired maximum speed of the vehicle. The vehicle operator selects the desired maximum speed by actuating the appropriate push button switch that is properly identified to indicate the maximum vehicular rate of travel which its actuation will yield. The potentiometer is connected to be adjusted by the operation of the accelerator pedal for regulating the reference signal voltage delivered from the potentiometer to an error amplifier so that the operator may vary the speed of the vehicle from zero to the maximum desired speed as established by the actuation of the appropriate switch of the voltage divider.

The motion of the vehicle drives either an alternator or a tachometer generator which delivers a speed signal voltage to the error amplifier. The latter has a summing network that produces an error voltage proportional to the difference between the voltages received from the accelerator potentiometer and the alternator. This error voltage is amplified and then utilized to energize an integrating motor which is connected to adjust the throttle valve of the engine carburetor for varying the speed of the vehicle. When the desired speed as established by the push button setting is arrived at, the speed signal voltage from the alternator is approximately equal to the reference signal voltage from the accelerator potentiometer so that there is essentially no error voltage and the motor is deenergized to maintain that setting of the throttle valve. A torque motor with spring return may be substituted for the integrating motor in which case the error voltage would be small but not zero under steady state conditions.

The system also includes a switching arrangement for bypassing the accelerator potentiometer and directing the voltage from the voltage divider directly to the error amplifier so that the vehicle will be operated at the selected speed without the necessity of the operator actuating the accelerator pedal. The vehicle will then maintain the selected speed with no effort on the part of the operator until the circuit from the voltage divider to the error amplifier is interrupted by manually opening a switch or by stepping on the brake pedal which is connected to open a switch in the circuit.

The output from the alternator is rectified before transmitting it to the error amplifier for comparison with the reference voltage that is being received by the error amplifier from the accelerator potentiometer or the voltage divider. The rectified voltage from the alternator is also directed to a voltmeter which is calibrated to indicate the speed of the vehicle. In addition, another portion of the alternating current from the alternator is conducted through an integrating network to an electromechanical counter for actuating the latter to indicate the distance the vehicle has traveled.

Figure 2:
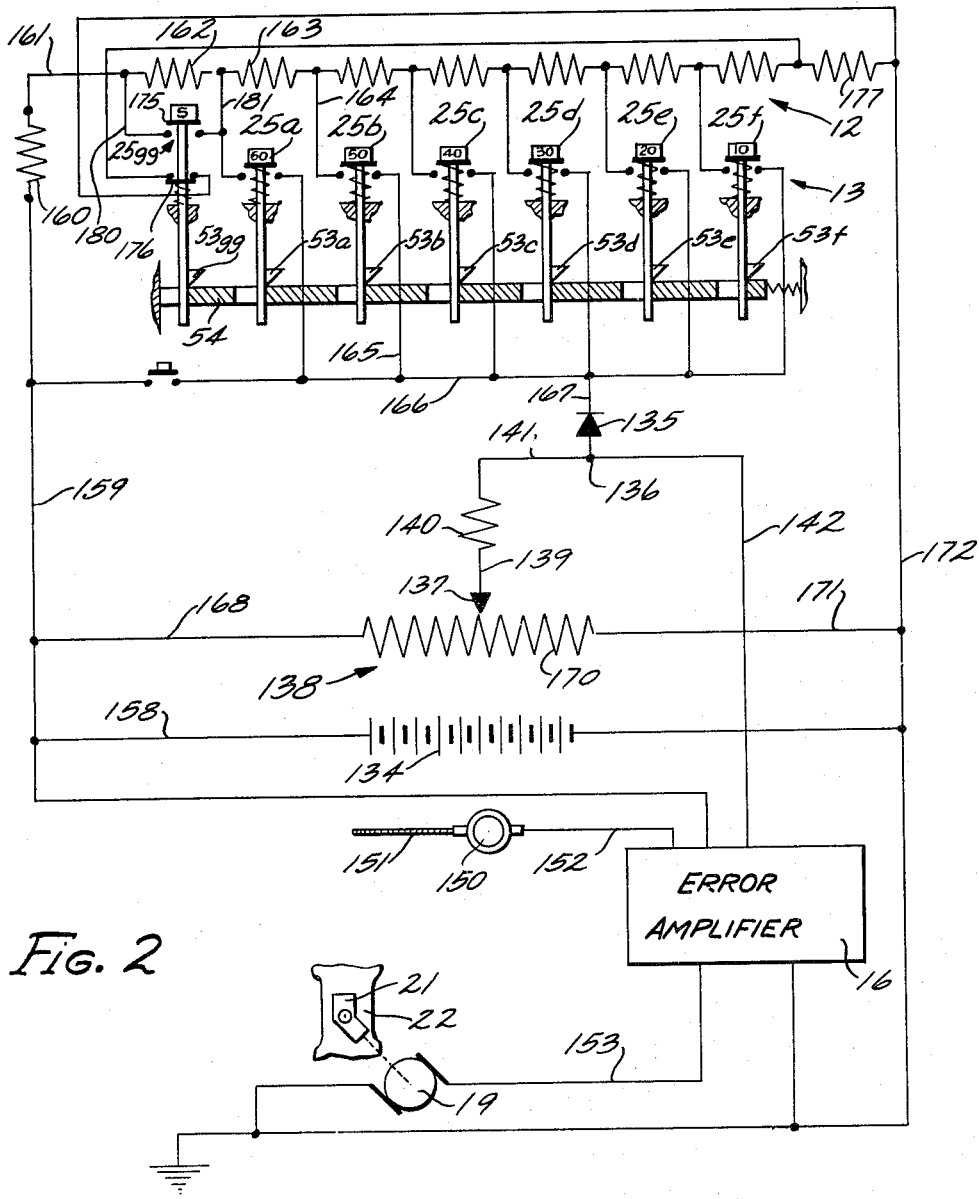

The foregoing and other objects of the invention, which will become more fully apparent from the following detailed description, may be achieved by means of the apparatus described in connection with the accompanying drawings in which:

FIGURE 1 is a diagrammatic view of an electrical vehicular speed control apparatus and electrical indicating mechanism incorporating the features of the present invention; and FIGURE 2 is a diagrammatic view of a modified electrical vehicular speed control apparatus.

The improved speed control apparatus of the present invention comprises generally a direct current source of electrical energy 11 for supplying current to a resistor voltage divider generally identified by the reference numeral 12. The desired maximum speed of the vehicle is set by the operator on a speed selector mechanism 13 which regulates the amount of voltage obtained from the voltage divider 12. The electrical potential from the voltage divider 12 is directed through another voltage divider comprised of the resistors 29, 44 and 73 to a potentiometer 14 which is actuated by an accelerator pedal 15. The voltage obtained from the potentiometer 14 constitutes a reference signal voltage which is directed to a polarity sensitive error amplifier or comparator 16 which is provided with suitable compensating networks as is well known in the art to stabilize the servo system.

The amplifier 16 compares the voltage received from the voltage divider 12 with a speed signal voltage generated by an alternator 17 and rectified before it is transmitted to the amplifier 16. The rectified voltage to the error amplifier 16 from the alternator 17 is of a polarity that is opposite to the polarity of the reference signal voltage produced by the voltage divider 12, and the amplifier 16 produces an error voltage in response to the difference between these two voltages. The error voltage is directed to an integrating motor 19 that is connected to operate an actuating lever 21 of a throttle valve 22 that regulates the speed of the vehicle engine 20.

In the illustrated embodiment, the alternator 17 is driven by the output of a transmission 18 which is connected to rotate the drive shaft of the automobile, the driving connection between the alternator 17 and the output of the transmission 18 being illustrated diagrammatically in the drawings by a broken line 23. The voltage developed by the alternator 17 is rectified by a rectifier 24 so that a direct current voltage is transmitted to the amplifier 16 by a pair of conductors 46 and 47 and returns to the ground side of the alternator through a conductor 48 and a conductor 49.

The voltage divider 12 is formed of a plurality of resistors that are calibrated to produce a reference signal in accordance with the desired maximum vehicle speed as established by actuation of the speed selector mechanism 13. The speed selector mechanism 13 comprises seven separate push button switches 25a to 25g inclusive that may be actuated selectively for obtaining the desired reference signal from the voltage divider 12. Thus, if it is desired that the vehicle operate at a maximum speed of sixty miles per hour, the push button 25a will be actuated to its closed position for bridging its cooperating terminals. This will complete a circuit directly from the source 11 through a conductor 26 and a conductor 27 through the now closed push button switch 25a and thence through a conductor 28 and through a resistor 29 to supply the appropriate reference signal voltage to the potentiometer 14.

However, if it is desired that the maximum speed of the vehicle be reduced to forty miles per hour, the operator will close the switch 25c which is marked to indicate that it is the forty miles per hour switch. The closure of the switch 25c will complete a circuit starting from the source 11 through the conductor 26 and two resistors 31 and 32. The circuit then continues through a conductor 33 and the now closed switch 25c and thence through a conductor 34 to the resistor 29 to deliver a reference signal voltage corresponding to the forty miles per hour requirement to the potentiometer 14. In like manner, any of the other switches 25a to 25g may be closed to vary the reference signal voltage produced by the voltage divider 12 for obtaining the desired maximum speeds for the motor vehicle. In each case the reference signal voltage obtained from the voltage divider 12 will be proportional to the desired maximum speed of the vehicle.

The push button switches 25a to 25f inclusive all operate in conjunction with resistors of the voltage divider 12 that are calibrated in increments of ten miles per hour of speed of the motor vehicle. Only one of these six switches can be effective at any one time for regulating the maximum speed of the vehicle. On the other hand, the push button switch 25g can be closed with any one of the other switches to produce an independent voltage for increasing the reference signal voltage sufficiently to add an additional five miles per hour to the speed established by any one of the other switches. To this end, while all of the other switches are connected to the resistor 29 by a common conductor 35, the voltage passing through the closed switch 25g by-passes the resistor 29 and is connected to a common terminal 36 to add to the reference signal passing through the resistor 29. The circuit for the additional five miles per hour reference signal voltage developed by closing the push button switch 25g originates at the source 11 and flows through the conductor 26 and thence through six resistors 31, 32, 37, 38, 39, and 41. The flow of current then continues through a conductor 42 to the now closed switch 25g and thence through a conductor 43 and a resistor 44 to a conductor 45 to the common terminal 36. At this point the reference signal from the closed switch 25g combines with the reference signal from whichever one of the other switches is closed and the combined voltages are delivered to the potentiometer 14.

Provision is made to release any of the closed switches 25a to 25g inclusive whenever any of the open switches are actuated to their closed condition. To this end, each of the switches 25a to 25g inclusive is provided with a rod 51a to 51g respectively that are slidably supported in a panel 52 and are connected to be moved axially with the actuation of their cooperating switches. Each of these switch rods 51a to 51g inclusive is provided with a cam catch 53a to 53g respectively. The cam catches 53a to 53g inclusive cooperate with a cam bar 54 for retaining the actuated switch in its closed position and to release it when another one of the switches is actuated.

The cam bar 54 is urged to the left, as viewed in the drawing, by a spring 55. The switch rods 51a to 51g inclusive extend through openings 56a to 56g inclusive provided in the bar 54 with a side of the opening bearing against one side of the switch rods when the bar 54 is in its normal position as established by the force of the spring 55.

In operation, assuming that the switch 25a is actuated to its closed condition, the downward movement of its associated rod 51a will cause the cam catch 53a mounted thereon to engage the edge of the opening 56a in the bar 54 to urge the latter rightwardly against the force developed by the spring 55. When the contact bar of the switch 25a is in engagement with its cooperating terminals, the cam catch 53a will have passed beneath the bottom surface of the cam bar 54 to permit the bar to be moved leftwardly by the spring 55 so that the upper surface of the cam catch 53 is engaged by the lower surface of the bar 54 to retain the switch 25a in its closed position.

Now, if the operator desires to reduce the maximum speed of the vehicle to thirty miles per hour he will actuate the switch 25d. As the latter is operated, its cam engages the edge of the opening 56d to shift the bar 54 in a rightward direction against the pressure of the spring 55. When a maximum movement in a rightward direction of the bar 54 is obtained, it will release the cam catch 53a to permit a spring 60a to shift the switch 25a upwardly to its open position. In this manner, operation of any one of the switches 25a to 25g will serve to release any of the other switches which were in the closed condition.

If it is desired to add five miles per hour to the maximum speed of the vehicle by actuation of the switch 25g, the latter may be actuated simultaneously with any of the other switches so that the cam bar 54 will retain both of these switches in a closed condition for obtaining the additional five mile per hour increment in the functioning of the system.

The potentiometer 14 is operated by the accelerator pedal 15 for varying the speed of the vehicle. The accelerator pedal 15 is connected to operate a slider 57 of the potentiometer 14 to vary the value of the reference signal voltage delivered to the amplifier 16 through a conductor 50, a normally closed contact 94 of a relay 81 and a conductor 58. In the drawing the accelerator pedal 15 is shown in its mid-point position but it may be released to move the slider 57 to the top of its cooperating resistor 59 for including maximum resistance in the circuit. When the accelerator pedal 15 is thus fully released, the vehicle engine will be operated at idle speed. As the accelerator pedal 15 is depressed, the slider 57 is moved downwardly to reduce the resistance of the potentiometer 14 for increasing the voltage delivered to the amplifier 16. When the accelerator pedal 15 is fully depressed, the slider 57 is at the bottom of its cooperating resistor 59 so that the entire reference signal voltage from the voltage dividers is delivered to the amplifier 16 for driving the motor vehicle at the maximum speed as established by the setting of the push button switches of the speed selector mechanism 13.

The reference signal voltage delivered to the amplifier 16 through the conductor 50, the normally closed contact 94 and the conductor 58 is compared with a speed signal voltage developed by the alternator 17. The alternator 17 is driven by the transmission 18 at a speed that is proportional to the speed of operation of the vehicle so that the voltage developed by the alternator 17 is likewise proportional to the speed of the vehicle and the rectified voltage delivered to the amplifier 16 from the rectifier 24, as previously mentioned, has a polarity that is opposite to the polarity of the reference signal voltage which is delivered to the amplifier 16. The voltage developed by the alternator 17 is transmitted to the rectifier 24 by a conductor 64. The direct current from the rectifier 24 is carried to the amplifier 16 by the pair of conductors 46 and 47 and returns to its source from the amplifier 16 through the conductors 48 and 49.

As previously mentioned, the amplifier 16 compares the reference signal voltage to the speed signal voltage and develops an error signal voltage which is proportional to the difference between the reference signal voltage and the speed signal voltage. This error voltage developed by the amplifier 16 flows into a conductor 62 connected to energize the field of the integrating motor 19. The flow of current continues from the motor 19 into a conductor 61 and thence to a conductor 63 which is connected to ground.

The motor 19, in turn, is connected to drive the actuating lever 21 of the throttle valve 22 for varying the speed of the vehicle engine. The motor 19 may be driven in either direction by the error voltage signal from the amplifier 16 for either reducing the speed of the engine or increasing the speed as dictated by the control apparatus.

The control exercised by the speed selector mechanism 13 may be by-passed by actuating a switch 70 which is located beneath the accelerator pedal 15 and is adapted to be actuated by fully depressing the accelerator pedal 15 so that maximum acceleration and speed may be achieved. When the switch 70 is closed, a circuit is completed from the direct current source 11 to a conductor 71 and thence through the now closed switch 70. From the switch 70 the circuit continues through a conductor 72 and a resistor 73 to the common terminal 36. This voltage is then directed to the potentiometer 14 for transmission to the error amplifier 16 for obtaining maximum acceleration and speed of the vehicle.

The operator may also by-pass the speed selector mechanism 13 by manually depressing a push button 75 for completing a circuit from the direct current source 11 through a conductor 71 to the closed push button switch 75. From the switch 75 the circuit continues through the conductor 72 and the resistor 73 to the common terminal 36 for transmission to the potentiometer 14 for controlling the operation of the vehicle. In order to maintain the floor switch 70 closed it is necessary for the operator to fully depress the accelerator pedal and thereby produce maximum acceleration and speed. On the other hand, the push button switch 75 may be manually closed and the accelerator pedal 15 operated in the usual manner for driving the vehicle through its complete range of speeds.

It is apparent that the circuit thus far described serves as an electrical governor for controlling the maximum speed at which the operator may drive the vehicle. The operator sets the maximum desired speed by actuating one of the switches 25a to 25f either individually or in combination with the switch 25g for establishing the maximum speed of the vehicle in five mile per hour increments. The speed of the vehicle is then regulated in the normal manner by operating the accelerator pedal 15 for varying the speed of the vehicle from zero to the maximum speed as established by the setting of the speed selector mechanism 13. If the operator releases the accelerator pedal 15, the movement of the vehicle will stop and the engine 20 will operate at an idle speed. In order to initiate movement of the vehicle the operator will depress the accelerator pedal 15 for progressively accelerating the vehicle from a zero speed to the maximum speed that has been set on the speed selector mechanism 13.

Frequently the situation arises where it is convenient to maintain a specific speed of the vehicle over relatively long periods without actuating the accelerator pedal 15. For example, on modern freeways it is possible to travel long distances without stopping and without varying the vehicular speed. In these situations it may become uncomfortable for the operator to continuously depress the accelerator 15 a specific amount over extended periods without the opportunity to move his leg. An apparatus that maintains the desired vehicle speed without the necessity of depressing the accelerator 15 contributes substantially to the comfort of the operator.

Numerous mechanical devices have been provided for holding the throttle in a specific position but these have been generally unsatisfactory since there is no provision to adjust the throttle for maintaining the desired speed when the vehicle is negotiating a grade either in an upward or a downward direction. The mechanical device holds the throttle in a specific position which may yield the desired speed on a level roadway but the vehicle will slow down when it is traveling up a grade and will accelerate beyond the desired speed when moving along a downgrade. The present invention includes circuitry to by-pass the potentiometer 14 and maintain the speed selected on the speed selector mechanism 13 without the necessity of the driver operating the accelerator pedal 15.

To this end, a by-pass push button switch 80 and a relay 81 are provided for by-passing the potentiometer 14 so that the vehicle will operate at the speed established by the actuation of the switches in the speed selector mechanism 13 without operating the accelerator pedal 15. To accomplish this, the switch 80 is closed manually for completing a circuit from the positive side of the direct current source 11 through a conductor 82 and a conductor 83 to a normally closed push button switch 84. From the switch 84 the circuit continues through a conductor 85 and a normally closed brake pressure switch 86 and thence through a conductor 87 to the now closed by-pass switch 80. The flow of current then continues through a conductor 88 to a coil 89 of the relay 81 and thence through a conductor 90 and a conductor 91 to return to its source represented by the battery 11.

The completion of this circuit by the closing of the manually operated push button 80 energizes the coil 89 of the relay 81 to actuate the relay for closing its two contacts 95 and 96 and opening its normally closed contact 94. The opening of the contact 94 interrupts the circuit from the slider 57 to the error amplifier 16. The closing of the contact 96 completes a holding circuit for maintaining the coil 89 energized after the push button 80 has been released. This circuit flows through a conductor 97 that is connected at one end to the conductor 87 and at its other end to one terminal of the contact 96. The now closed contact 96 bridges its associated terminals to carry the current from the conductor 97 to a conductor 98 that is connected to the coil 89 to maintain the latter energized. As a result, the vehicle operator need only to momentarily close the push button 80 for energizing the relay 81 to establish the circuit for maintaining the speed of the vehicle as established by the speed selector mechanism 13. If the operator desires to break this circuit to place the vehicle under the control of the accelerator pedal 15 he will actuate the normally closed push button switch 84 for breaking the circuit to the coil 89 for deenergizing the relay 81.

With the relay 81 actuated by energization of its coil 89 its normally open contact 95 will be closed to connect the common terminal 36 directly to the error amplifier 16 and by-pass the potentiometer 14. Thus, assuming that the forty mile per hour push button 25c of the speed selector mechanism 13 has been actuated by the operator to establish a maximum speed of forty miles per hour for the vehicle, the operator may maintain this speed without manipulating the accelerator pedal 15 by momentarily depressing the push button 80 for energizing the coil 89 of the relay 81 in the manner described. When the relay 81 is actuated, the reference signal from the voltage divider 12 will be transmitted to the error amplifier 16 without going through the potentiometer 14.

With the push button switch 25c actuated and held in the closed position by the cam bar 54, the circuit will originate at the direct current source 11 and continue through the conductor 26 and the resistors 31 and 32 to the conductor 33. The current then flows through the now closed switch 25c and the conductor 34 to the resistor 29 which transmits it to the common terminal 36. From the terminal 36 the current flow continues through a conductor 99 and then by-passes the potentiometer 14 to flow through a conductor 101 and the now closed contact 95 of the relay 81 and thence through a conductor 102 to the conductor 58 which carries the reference signal to the error amplifier 16.

Since the speed of the vehicle is regulated by the error voltage produced by the error amplifier 16, once the relay 89 is energized, the speed of the vehicle will not deviate appreciably from the selected speed as established by the setting of the speed selector mechanism 13 even though it is required to travel upgrade as well as downgrade. In all cases the error voltage from the amplifier 16 will automatically operate the motor 19 to adjust the throttle valve 22 for maintaining a substantially constant vehicular speed. In the mechanical devices previously provided for this purpose, the actuating lever 21 is held in a specific position for holding the setting of the throttle valve 22, and the latter is adjusted when the vehicle is negotiating an upward or downward grade so that the speed of the vehicle would vary accordingly. The present invention avoids this serious deficiency and maintains a constant speed within the capacity of the of the vehicle regardless of the grade that is being negotiated.

Although the speed retaining circuit may be interrupted by the operator by actuating the normally closed switch 84 to interrupt the circuit to the relay 81, the circuit will also be interrupted if the operator should depress the brake pedal of the vehicle. The circuit will be interrupted by the opening of the normally closed brake pressure switch 86 which will be actuated to its open position immediately upon the depression of the vehicle brake pedal (not shown) to also interrupt the circuit to the relay 81. Accordingly, after the brake pedal has been depressed, it will be necessary for the operator to again depress the push button switch 80 for completing the speed retaining circuit to maintain the speed selected on the speed selector mechanism 13 without operating the accelerator pedal 15.

The utilization of the alternator 17 for producing the speed signal voltage provides the additional advantage of enabling the output of the alternator 17 to be employed for actuating a distance indicator 105 and a speedometer 110. Since the alternator 17 produces an alternating current, the pulsating output can be amplified and then used to actuate a conventional electro-mechanical counter 111 which is actuated by electrical pulses and is provided with indicia 112 graduated in terms to indicate the distance that the vehicle has traveled.

The voltage for actuating the distance indicator 105 is transmitted from the alternator 17 through the conductor 64 to an integrator network 126 comprising a resistor 113 and capacitor 125 and then proceeds to a power amplifier 114 which serves to amplify the signal from the integrator 126. The amplifier 114 is powered by the direct current source 11 with the voltage therefrom being transmitted through the conductor 82 to a conductor 115, the voltage returning to its source from the amplifier 114 through a conductor 116 connected to ground.

The voltage for actuating the distance indicator 105 flows from the power amplifier 114 through a conductor 120 that is connected to the electro-mechanical counter 111 that comprises the distance indicator 105. The voltage from the distance indicator 105 flows into a conductor 121 to return to the ground side of the alternator 17.

The capacitor 125 is connected across the circuit from the resistor 113 to the conductor 121 and it cooperates with the resistor 113 to constitute the integrator 126 for maintaining a constant voltage to the mileage indicator 105 while varying only the frequency of the voltage delivered for actuating the mileage indicator 105 to indicate the miles that the vehicle has traveled. With this arrangement, regardless of how fast the alternator 17 is operated, the voltage to the mileage indicator 105 will remain substantially constant. However, at relatively low speeds, the alternating current voltage to the mileage indicator 105 will have a relatively low frequency and as the speed of the vehicle is increased to increase the rate of rotation of the alternator 17, the frequency of the voltage to the mileage indicator 105 will increase proportionately to produce the required electrical pulses for actuating the mileage indicator 105 so that it will give an accurate indication of the distance that the vehicle has traveled.

As previously mentioned, the output of the alternator 17 is also utilized for actuating a voltmeter 110 which is provided with a dial that is calibrated in terms of rate of travel, as for example, miles per hour, so that the voltmeter serves as a speedometer to indicate the rate of travel of the vehicle. Direct current is employed for actuating the voltmeter 110 and is therefore obtained from the rectifier 24, the rectified voltage being transmitted through the conductor 46 and a conductor 127 connected to the voltmeter 110. The current from the voltmeter 110 returns to ground through a conductor 128. A capacitor 131 is connected across the conductor 46 and a conductor 130 for smoothing the pulsating voltage that is delivered by the rectifier 24. With this arrangement, the voltage produced by the alternator 17 is proportional to the speed of the vehicle and the direct current voltage obtained from the rectifier 24 is correspondingly proportional to the speed of the vehicle so that the actuation of the voltmeter 110 by the output of the rectifier 24 will serve to accurately indicate the rate of travel of the vehicle at any time.

In the speed control circuit illustrated in FIG. 1 the sensitivity of the accelerator pedal 15 will vary with the different speeds that are selected on the speed selector mechanism 13. This is true because the maximum speed established by actuation of the selector mechanism 13 is obtained by depressing the accelerator pedal 15 to its limit of movement. This is true whether the maximum desired speed is ten miles per hour or whether it is sixty miles per hour. As a result, if the switch 25f is actuated to obtain a maximum speed of ten miles per hour, the vehicle will be at a standstill when the accelerator pedal 15 is fully released and it may be accelerated from this zero speed by depressing the accelerator pedal 15 to its limit of movement at which time a speed of ten miles per hour will be achieved. Accordingly the speed range is from zero to ten miles per hour. On the other hand, if the switch 25a is actuated to establish a maximum speed of sixty miles per hour the speed range is from zero to sixty miles per hour. The vehicle will again be at a standstill when the accelerator pedal 15 is fully released but it may be accelerated progressively to sixty miles per hour by depressing the accelerator pedal 15. It is therefore apparent, that if the switch 25f is actuated to obtain a maximum speed of ten miles per hour, the entire range of movement of the accelerator pedal 15 will obtain a maximum speed of ten miles per hour. On the other hand, the entire range of movement of the accelerator pedal 15 will produce a speed from zero miles per hour to sixty miles per hour if the switch 25a is actuated. It is therefore obvious that the sensitvity of the accelerator pedal 15 will vary as the different maximum speeds are selected on the speed selector mechanism 13.

If such variance in the sensitivity of the accelerator pedal is objectionable it may be avoided by utilizing the alternative speed control circuit illustrated in FIG. 2 where similar parts are identified by the same reference numerals as used in FIG. 1. The circuit shown in FIG. 2 comprises the voltage divider 12 and the speed selector mechanism 13 having the same switches 25a to 25f inclusive for obtaining variable reference voltage for producing maximum speeds from sixty miles per hour to ten miles per hour in ten mile per hour increments with the five mile per hour switch being identified by the reference numeral 25gg since it differs somewhat from the five mile per hour switch 25g depicted in FIG. 1. The switches are held in their actuated position by the cam bar 54 engaging the cam catches 53a to 53gg in the same manner as described for the speed selector mechanism 13 shown in FIG 1.

The voltage divider 12 is energized by a direct current source 134 and delivers a variable reference voltage depending upon the setting of the speed selector mechanism 13 to a diode 135 which is connected to a juncture 136. A slider 137 of a potentiometer 138 is arranged to be actuated by an accelerator pedal 139 so that the potentiometer may deliver a variable reference voltage, depending upon its setting, through a resistor 140 and a conductor 141 to the juncture 136.

The slider 137 is shown in FIG. 2 at its mid-point position but would be at the extreme rightward end of the potentiometer 138, as viewed in FIG. 2, when the automobile engine is idling. With the slider 137 in its extreme rightward position along the potentiometer 138, a minimum voltage is delivered from the potentiometer 138 to the juncture 136. This voltage is negative with respect to the voltage delivered to the diode 135 from the voltage divider 12 so that the diode 135 will not conduct a voltage. Accordingly, the voltage from the potentiometer 138 will be transmitted through a conductor 142 to the error amplifier 16.

As the accelerator pedal 139 is depressed, the slider 137 will be moved leftwardly along the potentiometer, as viewed in FIG. 2, to progressively increase the voltage delivered to the juncture 136. This voltage, in turn, will be transmitted to the error amplifier 16 by the conductor 142 and will constitute the reference signal for determining the speed of the vehicle. Therefore, as the accelerator pedal is depressed, to move the slider 137 in a leftward direction, the reference voltage to the error amplifier 16 will be increased to progressively accelerate the vehicle. However, when the voltage from the potentiometer 138 at the juncture 136 exceeds the voltage delivered to the diode 135 by the voltage divider 12, the diode 135 will begin to conduct electricity and the conductor 142 will then carry the voltage from the voltage divider 12 rather than from the potentiometer 138 to the error amplifier 16. Thus, the diode 135 serves as an electrical valve that regulates the transmission of voltage to the amplifier 16 from either the potentiometer 138 or from the voltage divider 12. As a result, the accelerator pedal 139 will be actuated to initiate acceleration of the vehicle from zero miles per hour to the speed established by the speed selector mechanism 13. Further depression of the accelerator pedal 139 will have no effect because when the selected speed is reached, the voltage from the voltage divider 12 will pass through the diode 135 and will comprise the reference voltage to the error amplifier 16 for controlling the speed of the vehicle. The sensitivity of the accelerator pedal 13 will therefore remain constant.

In the previous embodiment illustrated in FIG. 1, the speed signal voltage delivered to the error amplifier 16 was obtained from the alternator 17. In the present embodiment the speed signal voltage is obtained from a tachometer 150 which is driven by a speedometer cable 151 and produces a voltage which is proportional to the speed of the vehicle. This speed signal voltage is carried by a conductor 152 to the error amplifier 16 where it is compared with the reference voltage carried to the error amplifier 16 by the conductor 142. The error voltage developed by the error amplifier 16 is transmitted through a conductor 153 to the motor 19 for actuating the lever 21 of the throttle valve 22 to regulate the speed of the vehicle.

Thus, assuming that it is desired to operate the vehicle at a maximum speed of fifty miles per hour, the switch 25b of the speed selector mechanism 13 will be actuated and it will be held in its closed position by the cam bar 54 in the manner previously described. This completes a circuit from the direct current source 134 through a conductor 158 and a common conductor 159 to a resistor 160. From the resistor 160 the circuit continues through a conductor 161 and two resistors 162 and 163 of the voltage divider 12. The circuit then continues through a conductor 164 to the now closed switch 25b and thence through a conductor 165 and a common conductor 166 through a conductor 167 connected to one side of the diode 135.

With the accelerator pedal 139 in its fully released position, the slider 137 will be at the extreme rightward end of the potentiometer 138, as viewed in FIG. 2, to incorporate the full resistance of the potentiometer in the circuit. The potentiometer circuit originates at the direct current source 134 and flows through the conductor 158 and the common conductor 159 to a conductor 168 connected to one end of a resistor 170 of the potentiometer 138, the opposite end of the resistor 170 being connected by a conductor 171 to a conductor 172 that is connected to the negaive side of the direct current source 134. However, the current from the resistor 170 flows into the slider 137 and the accelerator pedal 139, through the resistor 140 and the conductor 141 to the juncture 136.

When the slider 137 is in its extreme rightward position, as viewed in FIG. 2, to include the entire resistance of the potentiometer 138, a minimum voltage is delivered to the juncture 136 so that the diode 135 is not conducting. As a result, the voltage from the potenitomeer 138 is carried by the conductor 142 to the error amplifier 16 to serve as a reference signal. As the accelerator pedal 139 is depressed it moves the slider 137 to the left to reduce the resistance of the potentiometer 138 and increase the voltage delivered to the juncture 136. This voltage, in turn, will be carried by the conductor 142 to the error amplifier 16 for progressively accelerating the vehicle. This will continue until a speed of fifty miles per hour is reached, when the voltage from the potentiometer 138 will exceed the voltage delivered by the voltage divider 12 to the opposite side of the diode. When this occurs, the diode 135 will become conductive so that the voltage from the voltage divider 12 will be carried to the conductor 142 to the error amplifier 16 for regulating the operation of the vehicle. Therefore, further depressing of the accelerator pedal 139 to cause additional movement of the slider 137 to the left will have no effect on the speed of the vehicle. This is true because the increased voltage from the potentiometer 138 will not be carried to the error amplifier 16 by the conductor 142 inasmuch as the diode 135 is conducting. Instead the voltage from the voltage divider 12, is transmitted to the error amplifier 16.

If it is desired to operate the vehicle at a speed of fifty five miles per hour, the switch 25gg is actuated in combination with the switch 25b and both are retained in their actuated position by the cam bar 54. The switch 25gg includes a normally open contact 175 and a normally closed contact 176. The normally closed contact 176 serves to by-pass a resistor 177 when the switch is not actuated. However, when it is desired to increase the speed of the vehicle by a five mile per hour increment, and the switch 25gg is actuated, its normally open contact 175 will be closed to by-pass the resistor 162 for increasing the voltage delivered to the diode 135. However, when this resistor is by-passed by closing the contact 175, the contact 176 will open to include the resistor 177 at the opposite end of the circuit so that a constant current will be maintained in the circuit.

When the switch 25gg is actuated in combination with the switch 25b, the circuit will flow from the conductor 161 into a conductor 180 through the now closed contact 175 and a conductor 181 to the resistor 163. The circuit will then continue in the manner previously described for actuation of the switch 25b alone but it will be apparent that the actuation of the switch 25gg has removed the resistor 162 from the circuit to increase the voltage delivered to the diode 135 sufficiently to produce an additional five miles per hour speed in the vehicle.

In the same manner any one of the switches 25a to 25f may be actuated individually or in combination with the switch 25gg for producing maximum speeds that vary in increments of five miles per hour. The accelerator pedal 139 may then be operated for accelerating the vehicle from a zero speed to the speed selected by actuation of the appropriate switch of the speed selector mechanism 13 and when this speed is attained, further depression of the accelerator pedal 139 will not accelerate the vehicle any further and will have no additional effect.

From the foregoing detailed description of the construction and operation of the illustrative embodiments of the present invention it will become apparent that a new and improved electric speed control system for motor vehicles has been provided in which the speed of the vehicle is regulated by an electrical servo system equipped with a unique control for selectively establishing the maximum speed of the vehicle along with an arrangement for maintaining a desired vehicular speed without actuating the accelerator pedal. In addition, the speed and distance indicators are actuated electrically to avoid mechanical linkages between the vehicle power train and the indicators as well as between the accelerator pedal and the throttle control valve.

Although the illustrative embodiments of the present invention have been described in considerable detail for the purpose of making a full disclosure of practical operative arrangements by means of which the invention may be practised, it is to be understood that various novel features of the invention may be incorporated in other arrangements without departing from the spirit and scope of the invention as defined in the subjoined claims.

The principles of the invention having now been fully explained in connection with the foregoing description of embodying structure, we hereby claim as our invention:

1. In a system for regulating the speed of a self-propelled vehicle having a throttle valve for varying its speed; a source of electrical energy; a voltage divider connected to be energized by said source; a speed selector mechanism actuatable selectively to adjust said voltage divider for obtaining a reference voltage from said voltage divider which is proportional to the maximum desired speed of the vehicle; a speed signal voltage generator connected to produce a voltage that is proportional to the actual speed of the vehicle; a comparator connected to receive the reference signal voltage and the speed signal voltage to produce an error voltage of a value which depends upon the difference in the value of said reference and speed signal voltages; an electric motor arranged to be energized in response to the error voltage produced by said comparator, said motor being connected to actuate said throttle valve for varying the speed of the vehicle; and a potentiometer connected to control the flow of the reference voltage to said comparator and adjustable by the vehicle operator from a standstill to the maximum speed established by said speed selection mechanism.

2. In a system for regulating the speed of a motor vehicle having a throttle; settable means arranged to selectively produce reference signal voltages proportional to the desired maximum speed of the vehicle; a speed signal voltage generator connected to produce voltages proportional to the actual speed of the vehicle; error signal means connected to receive the reference signal voltages and the speed signal voltages to produce error signal voltages proportional to the difference between said voltages; a source of power connected to be operated under the control of the error signal voltages and arranged to actuate the throttle for adjusting the speed of the vehicle in accordance with the error signal voltages; and control means connected between said settable means and said error signal means and regulated by the operator for controlling the transmission of the reference signal voltages to said error signal means so that the operator may control the speed of the vehicle from zero speed to a maximum speed as established by the setting of said settable means.

3. In a system for regulating the speed of a self-propelled vehicle having a throttle for varying its speed; settable means for selectively producing reference signal voltages proportional to the desired maximum speed of the vehicle; a speed signal voltage generator connected to produce voltages proportional to the actual speed of the vehicle; a comparator connected to receive the reference signal voltages and the speed signal voltages to produce error signal voltages proportional to the difference between said voltages; an electric motor arranged to be energized in response to the error voltages produced by said comparator, said motor being connected to actuate said throttle for varying the speed of the vehicle; and a potentiometer connected to control the flow of the reference voltages to said comparator and adjustable by the vehicle operator for regulating the speed of the vehicle from a standstill to the maximum speed established by the setting of said settable means.

4. In a system for regulating the speed of a self-propelled vehicle having a throttle for varying its speed; a source of electrical energy; a voltage divider connected to be energized by said source; a speed selector mechanism actuatable selectively to adjust said voltage divider for obtaining a reference voltage from said voltage divider which is proportional to the maximum desired speed of the vehicle; a potentiometer connected to be energized by said source of electrical energy, said potentiometer being adapted to be regulated by the operator of the vehicle for controlling the voltage to vary the rate of travel of the vehicle; a speed voltage generator operated by the power train of the vehicle for producing a speed voltage proportional to the speed of the vehicle; an error amplifier connected to receive the speed voltage from said speed voltage generator and the reference voltage from said potentiometer and said voltage divider selectively for producing an error voltage that is proportional to the difference between said speed voltage and said reference voltage; a diode having one side connected to said voltage divider and its opposite side connected to said potentiometer so that the voltage from said potentiometer is directed to said error amplifier until the voltage from said potentiometer exceeds the voltage from said voltage divider to cause said diode to become conductive whereupon the diode directs the voltage from said voltage divider to said error amplifier while interrupting the flow of the voltage from said potentiometer; and a motor connected to be energized in response to the error voltage and arranged to actuate the throttle for varying the speed of the vehicle in response to the error voltage.

5. In a system for regulating the speed of a self-propelled vehicle having a throttle; a source of electrical energy; a comparator connected to receive reference voltages and speed voltages for producing error voltages that are proportional to the difference between the speed and reference voltages; a voltage divider connected to be energized by said source and to direct reference voltages to said comparator; a speed selector mechanism actuatable selectively to adjust said voltage divider for obtaining reference voltages from said voltage divider which are proportional to the maximum desired speed of the vehicle; a diode having its first side connected to said voltage divider and its second side to said comparator for controlling the flow of voltages from said voltage divider to said comparator; a potentiometer connected to be energized by said source of electrical energy and arranged to be regulated by the operator of the vehicle for controlling the voltage, said potentiometer being connected to said comparator for furnishing reference voltages thereto, the circuit to said comparator being connected to the second side of said diode so that the reference voltages from said potentiometer will flow to said comparator until its voltage exceeds the voltage from said voltage divider when the diode becomes conductive to direct the reference voltage from said voltage divider to said comparator while interrupting the flow of the reference voltage from said potentiometer to said comparator; a speed voltage generator operated by the power train of the vehicle for producing a speed voltage proportional to the speed of the vehicle, said speed voltage generator being connected to direct its voltage to said comparator; and a motor connected to be energized in response to the error voltage from said comparator and arranged to actuate the throttle for varying the speed of the vehicle in accordance with the error voltage.

6. In a system for regulating the speed of a motor vehicle having a throttle; settable means for producing a reference voltage proportional to the desired maximum speed of the vehicle; adjustable means under the control of the operator for producing variable reference voltages; a speed voltage generator operated by the power train of the vehicle for producing speed voltages proportional to the speed of the vehicle; a comparator connected to receive the reference voltages and the speed voltages for producing an error voltage that is proportional to the difference between the speed voltage and the reference voltage; an electrical control valve connected to direct the voltage from said adjustable means to said comparator and interrupt the flow of the reference voltage from said settable means to said comparator until the reference voltage from said adjustable means exceeds the reference voltage from said settable means when said control valve interrupts the reference voltage from said adjustable means and directs the reference voltage from said settable means to said comparator; and a motor operating in response to the error voltage from said comparator and connected to actuate the throttle for varying the speed of the vehicle in accordance with the error voltage.

7. In a system for regulating th speed of a self-propelled vehicle having a throttle for varying its speed; reference voltage means adjustable by the operator for selectively producing reference signal voltages proportional to the desired speed of the vehicle; a speed signal voltage generator connected to produce a voltage proportional to the actual speed of the vehicle; a comparator connected to receive the reference signal voltages and the speed signal voltages to produce error signal voltages proportional to the difference between said voltages; an electric motor connected to be operated under the control of the error signal voltages from said comparator and arranged to actuate the throttle for adjusting the speed of the vehicle in accordance with the error signal voltages; and control means connected between said reference voltage means and said comparator for controlling the transmission of the reference signal voltages to said comparator, said control means being regulated by the operator for controlling the speed of the vehicle from zero speed to a maximum speed.

8. In a system for regulating the speed of a self-propelled vehicle having a throttle for varying its speed; a source of reference signals corresponding to the desired speed of the vehicle; a speed signal generator connected to produce a speed signal indicating the actual speed of the vehicle; error signal means connected to receive the reference and speed signals and produce an error signal proportional to the difference between said reference and speed signals; a source of power operating under the control of the error signal from said error signal means and arranged to actuate the throttle for adjusting the speed of the vehicle; and control means connected between said source of reference signals and said error signals so that it can be regulated by the operator for controlling the transmission of the reference signal to said error signal means so that the operator may control the speed of the vehicle from a standstill to a maximum speed.

9. In a system for regulating the speed of a self-propelled vehicle having a throttle for varying its speed; a source of reference signals corresponding to the desired maximum speed of the vehicle; a speed signal generator connected to produce a speed signal indicating the actual speed of the vehicle; error signal means connected to receive the reference and speed signals for producing an error signal that is proportional to the difference between said reference and speed signals; a source of power operating under the control of said error signal and connected to actuate the throttle for adjusting the speed of the vehicle according to the error signal; control means adapted to be regulated by the operator for controlling the transmission of the reference signal to said error signal means so that the operator may control the speed of the vehicle from a standstill to a maximum speed as determined by the reference signal; and by-pass means actuatable to by-pass said control means and transmit the reference signals directly to said error signal means for operating the vehicle at the desired maximum speed as established by said reference signals without operating said control means.

10. In a system for regulating the speed of a self-propelled vehicle having a throttle for varying its speed and a brake for stopping it; settable means for selectively producing reference signal voltages proportional to the desired maximum speed of the vehicle; a speed signal voltage generator connected to produce a voltage proportional to the actual speed of the vehicle; a comparator connected to receive the reference signal voltage and the speed signal voltage to produce an error signal voltage proportional to the difference between said voltages; an electric motor connected to be energized under the control of the error signal voltage and arranged to actuate the throttle for adjusting the speed of the vehicle in accordance with the error signal voltage; control means adapted to be regulated by the operator for controlling the transmission of the reference signal voltage to said comparator so that the operator may control the speed of the vehicle from zero speed to a maximum speed as established by said settable means; a by-pass circuit connected to by-pass said control means for transmitting the reference signal voltage directly to said comparator for driving the vehicle at the desired maximum speed established by said settable means without operating said control means; switch means operable by the operator for actuating and inactivating said by-pass circuit; and a brake switch connected to be actuated by the operation of the brake for inactivating the by-pass circuit whenever the brake is applied.

References Cited by the Examiner
UNITED STATES PATENTS

| | | | |
|---|---|---|---|
| 910,898 | 1/09 | Bonbright | 324—70 X |
| 1,933,086 | 10/33 | Battegay | 324—78 |
| 2,021,832 | 11/35 | Callihan. | |
| 2,090,087 | 8/37 | Werder | 324—70 |
| 2,159,330 | 5/39 | Kelly | 324—78 X |
| 2,192,714 | 3/40 | Norman et al. | 180—82.1 |
| 2,228,393 | 1/41 | Leaming. | |

(Other references on following page)

UNITED STATES PATENTS

| | | | |
|---|---|---|---|
| 2,295,118 | 9/42 | Le Clair | 324—78 X |
| 2,468,696 | 4/49 | Westberg | 320—70 X |
| 2,502,712 | 4/50 | Floyd | 324—70 |
| 2,666,180 | 1/54 | Petroff | 324—78 |
| 2,831,546 | 4/58 | Henderson | 180—82.1 |
| 2,911,077 | 11/59 | Carter. | |
| 2,927,268 | 3/60 | Haggai et al. | 324—70 |
| 2,929,992 | 3/60 | Carter | 324—70 |
| 2,971,596 | 2/61 | Davis et al. | 180—82.1 |
| 2,983,867 | 5/61 | Sperry | 324—70 |
| 3,116,807 | 1/64 | Wilson | 180—82.1 |

A. HARRY LEVY, *Primary Examiner.*